US007156663B1

(12) United States Patent
Gerhart

(10) Patent No.: US 7,156,663 B1
(45) Date of Patent: Jan. 2, 2007

(54) HOME EXTERIOR SELECTION KIT

(76) Inventor: Jon H. Gerhart, 846 Hill Rd., Wernersville, PA (US) 19565

( * ) Notice: Subject to any disclaimer, the term of this patent is extended or adjusted under 35 U.S.C. 154(b) by 212 days.

(21) Appl. No.: 11/042,782

(22) Filed: Jan. 25, 2005

(51) Int. Cl.
   *G09B 25/00* (2006.01)
(52) U.S. Cl. .......................................... 434/74; 434/72
(58) Field of Classification Search ............ 434/72–74, 434/78, 79, 81; 446/476, 478; 52/64, 66
   See application file for complete search history.

(56) References Cited

U.S. PATENT DOCUMENTS

| | | | |
|---|---|---|---|
| 910,240 A * | 1/1909 | Stecher | 434/79 |
| 1,648,987 A | 11/1927 | Griffes | |
| 1,668,428 A | 5/1928 | Shope | |
| 1,688,249 A * | 10/1928 | Stenz | 434/74 |
| 2,214,987 A * | 9/1940 | Bolhuis | 434/72 |
| 2,259,435 A * | 10/1941 | Collins | 434/74 |
| 2,315,463 A | 3/1943 | Tingley et al. | |
| 2,339,044 A | 1/1944 | Barrett | |
| 2,635,359 A | 4/1953 | Broscious | |
| 2,748,499 A * | 6/1956 | Shafer | 434/74 |
| 2,760,277 A * | 8/1956 | Keene | 434/72 |
| 2,871,619 A * | 2/1959 | Walters | 446/110 |
| 2,904,927 A * | 9/1959 | Katz | 446/105 |
| 2,951,311 A * | 9/1960 | Luther | 446/92 |
| 3,559,306 A * | 2/1971 | Winans | 434/79 |
| 3,659,358 A | 5/1972 | Brown | |
| 4,321,037 A | 3/1982 | Miller | |
| 5,228,857 A * | 7/1993 | Roland | 434/74 |
| 6,073,404 A * | 6/2000 | Norfleet | 52/236.3 |
| 6,524,107 B1 | 2/2003 | Brown | |

* cited by examiner

*Primary Examiner*—Kurt Fernstrom
(74) *Attorney, Agent, or Firm*—Garcia-Zamor IP Law; Ruy M. Garcia-Zamor

(57) ABSTRACT

A home exterior selection kit includes a tower body having lateral sides, each having at least first and second areas configured to detachably engage a panel representing an exterior material.

20 Claims, 6 Drawing Sheets

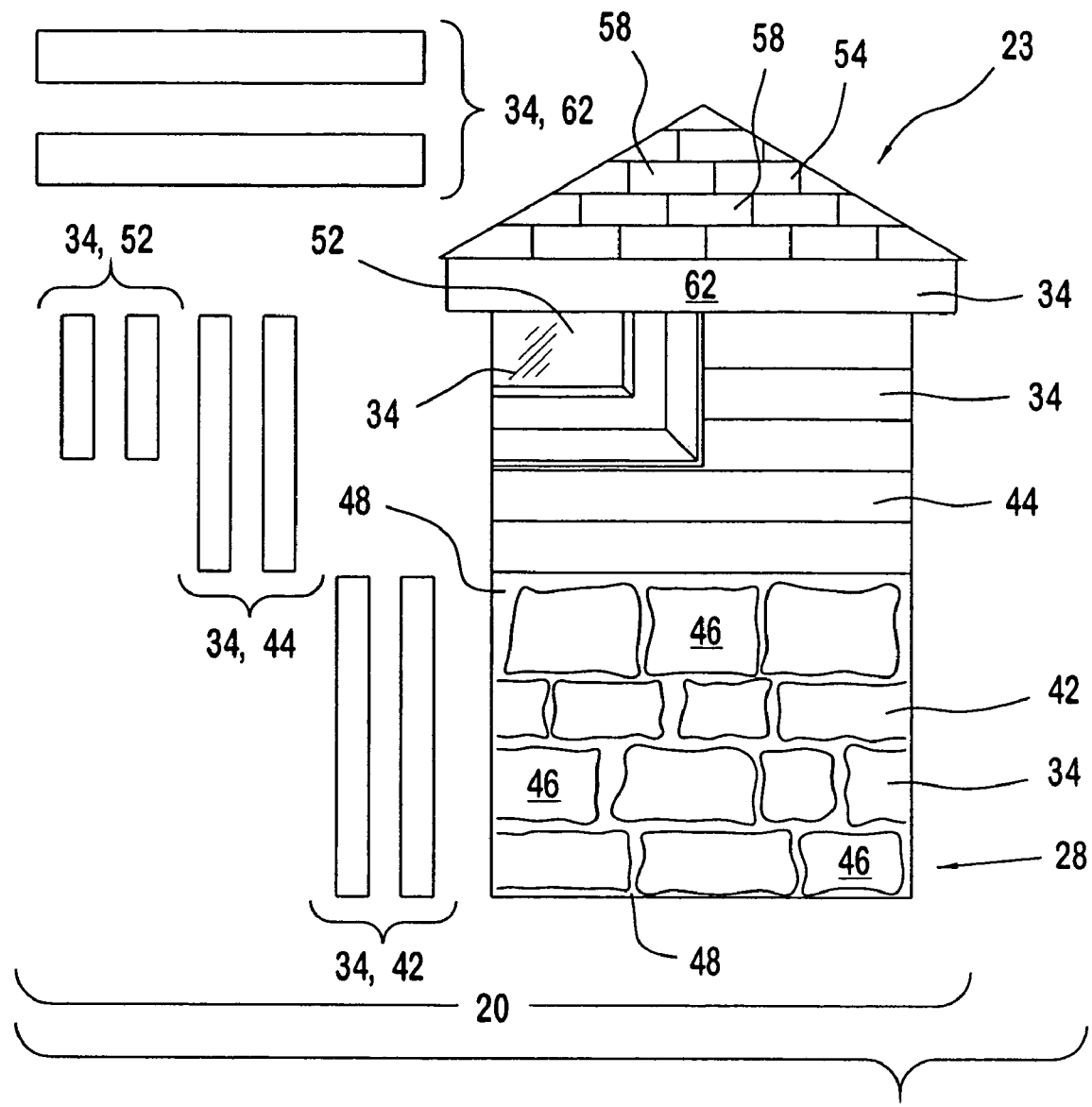
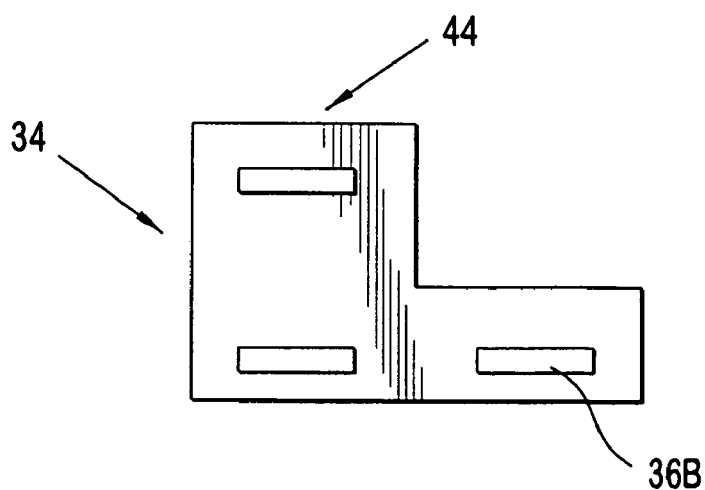

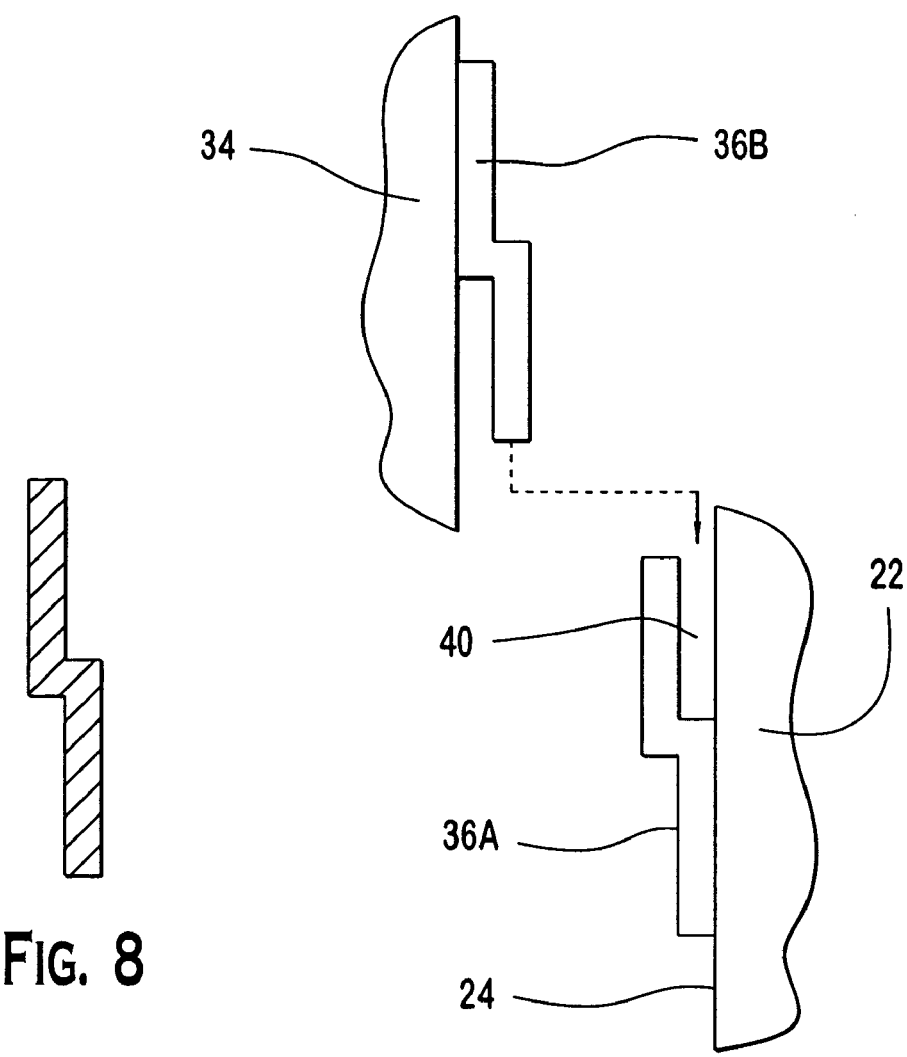
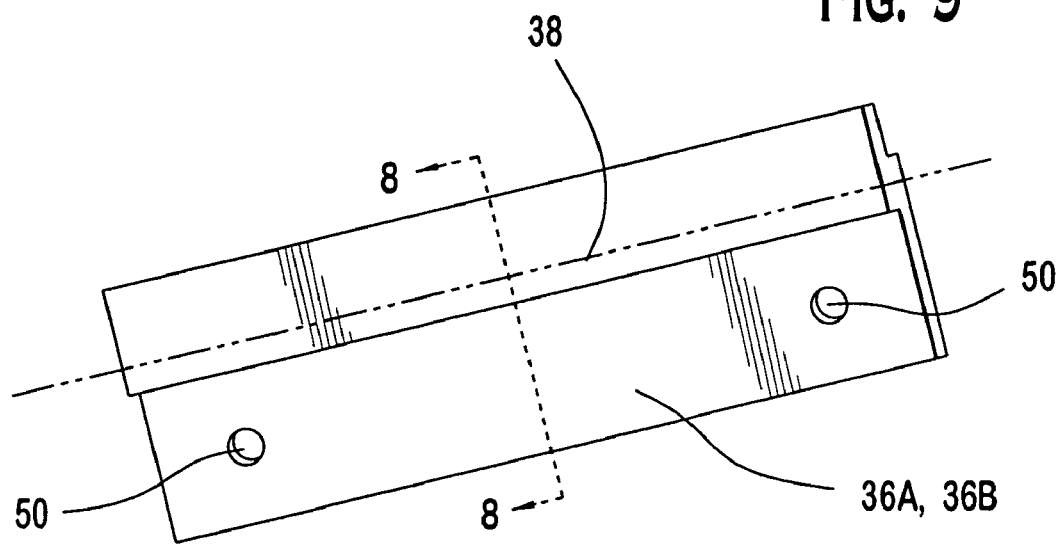

HOME EXTERIOR SELECTION KIT

BACKGROUND

The present invention is generally directed to new home exteriors and, more specifically, to a home exterior selection kit and/or a method of selecting a home exterior.

When purchasing a new home or remodeling an existing home, it is often difficult to select the exterior materials to be used. Some builders provide small samples of the different materials to facilitate selection by a homeowner. However, properly envisioning how different exterior materials will look in combination is often difficult for a homeowner. To facilitate exterior material selection, small, mailable home models have been developed that include slotted frames to allow cardboard to be slid into various slots of the model home. The cardboard has pictures of different exterior materials to allow the homeowner to attempt to determine whether various exterior materials should be used with each other. This method suffers from various drawbacks. First, the cardboard representations of exterior materials typically look significantly different from the actual materials. Additionally, the small scale of models tends to make it difficult for a person to envision what the finished home exterior would look like.

It would be advantageous to provide a home exterior selection kit that incorporates, at least partially, the exterior materials being represented; that simplifies the selection process; that allows for side-by-side comparison of different home exteriors; and that allows homeowners to view possible home exteriors in various lighting conditions.

SUMMARY

Briefly stated, one embodiment of the present invention is directed to a home exterior selection kit. The home exterior selection kit includes a tower body having lateral sides and first and second ends. The first end forms a base. Each of the lateral sides has at least first and second areas each configured to detachably engage a panel. A plurality of masonry panels each have an exterior layer formed at least partially of a masonry material. The masonry panels are detachably engageable with the first area on each of the lateral sides. A plurality of siding panels each having an exterior layer are formed at least partially of a siding material. The siding panels are detachably engageable with the second area on each of the lateral sides. A roof support member is rotatably located on the second end of the tower body. At least one roofing material is located on at least an upper portion of the roof support member.

In a separate aspect, the present invention is directed to a home exterior selection kit that includes a tower body having lateral sides and first and second ends. The first end forms a base. Each of the lateral sides has at least first and second areas each configured to detachably engage a panel. A plurality of masonry panels are each detachably engageable with the first area on each of the lateral sides. A plurality of siding panels are each detachably engageable with the second area on each of the lateral sides. A roof support member is located on the second end of the tower body. A roofing panel is located on the roof support member.

In a separate aspect, the present invention is directed to a method of selecting a home exterior. The method includes: providing a plurality of selection towers each having a tower body with lateral sides and first and second ends. The first end forming a base, each tower body having a roof support member on the second end thereof, the roof support member having an exterior layer formed by a roofing material; selecting the one of the plurality of selection towers having a desired roofing material thereon; attaching panels to the selected selection tower, the panels representing possible exterior materials for the home, or in an exterior portion of the panels is formed at least partially by the actual material being represented; and selecting a desired home exterior using the panels and the selected selection tower.

In a separate aspect, the present invention is directed to a method of selecting an exterior for a house. The method includes providing a selection tower having lateral sides configured for detachably receiving at least two panels each representing an exterior material, each of the two panels having an exterior portion formed by the actual material represented, the tower includes a rotatable roof support member that has a predetermined roofing element thereover and has multiple soffit panels proximate to an interface between the rotatable roof support member and the lateral sides of the selection tower. Attaching at least two panels to one of the lateral sides of the selection tower so that the majority of the one of the lateral sides is covered by selected exterior materials; rotating the roof support member to align a selected soffit panel with the selected exterior materials.

BRIEF DESCRIPTION OF THE DRAWINGS

The foregoing summary, as well as the following detailed description of the preferred embodiment of the present invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings:

FIG. 1 is an elevational view of a preferred embodiment of a home exterior selection kit according to the present invention which includes a selection tower; the selection tower has a masonry panel, a siding panel, a shutter panel, and a soffit panel attached to a lateral side thereof; one style of roofing material is shown on the roof support member;

FIG. 2 is a rear elevational view of the siding panel of FIG. 1; the second connector plates are preferably disposed on an inner surface of the siding panel;

FIG. 7 is a perspective view of a preferred first or second connection plate;

FIG. 8 is a cross-sectional view of the first or second connection plate of FIG. 7 as taken along the line 8—8 of FIG. 7;

FIG. 9 is an elevational, broken away view illustrating a first connection plate attached to a lateral side of the tower body to form a corresponding slot between the first connection plate and the tower body; a panel having a second connection plate thereon is located above the first connection plate; the dashed arrow shows how the second connection plate is inserted into the corresponding slot formed by the first connection plate to secure the panel to the tower body;

DETAILED DESCRIPTION OF THE PREFERRED EMBODIMENTS

Figure 4:
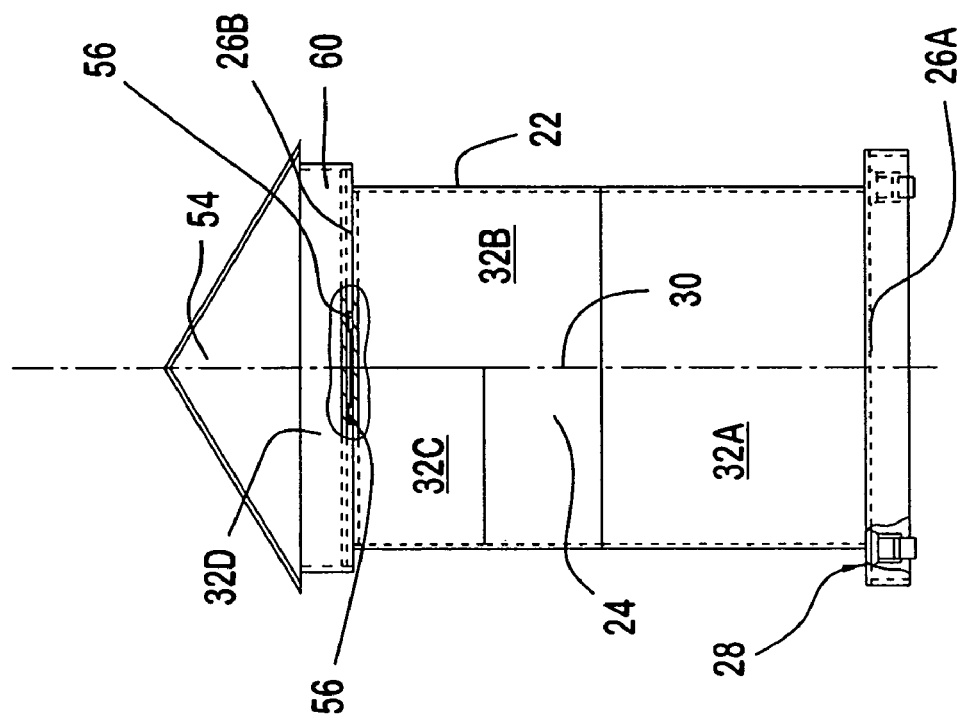
FIG. 4 is a second elevational, partially broken away view of the tower body of the selection tower of FIG. 1; a turntable bearing preferably allows the roof support member to be rotatably attached to a second end of the tower body; it is preferable that wheels (i.e. caster wheels) are located on a first end of the tower body to facilitate movement thereof.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the selection tower and designated parts thereof. The words "a," and "one", as used in the claims and in the corresponding portions of the specification, are defined as including one or more of the referenced item unless specifically stated otherwise. This terminology includes the words above specifically mentioned, derivatives thereof, and words of similar import.

Figure 10:
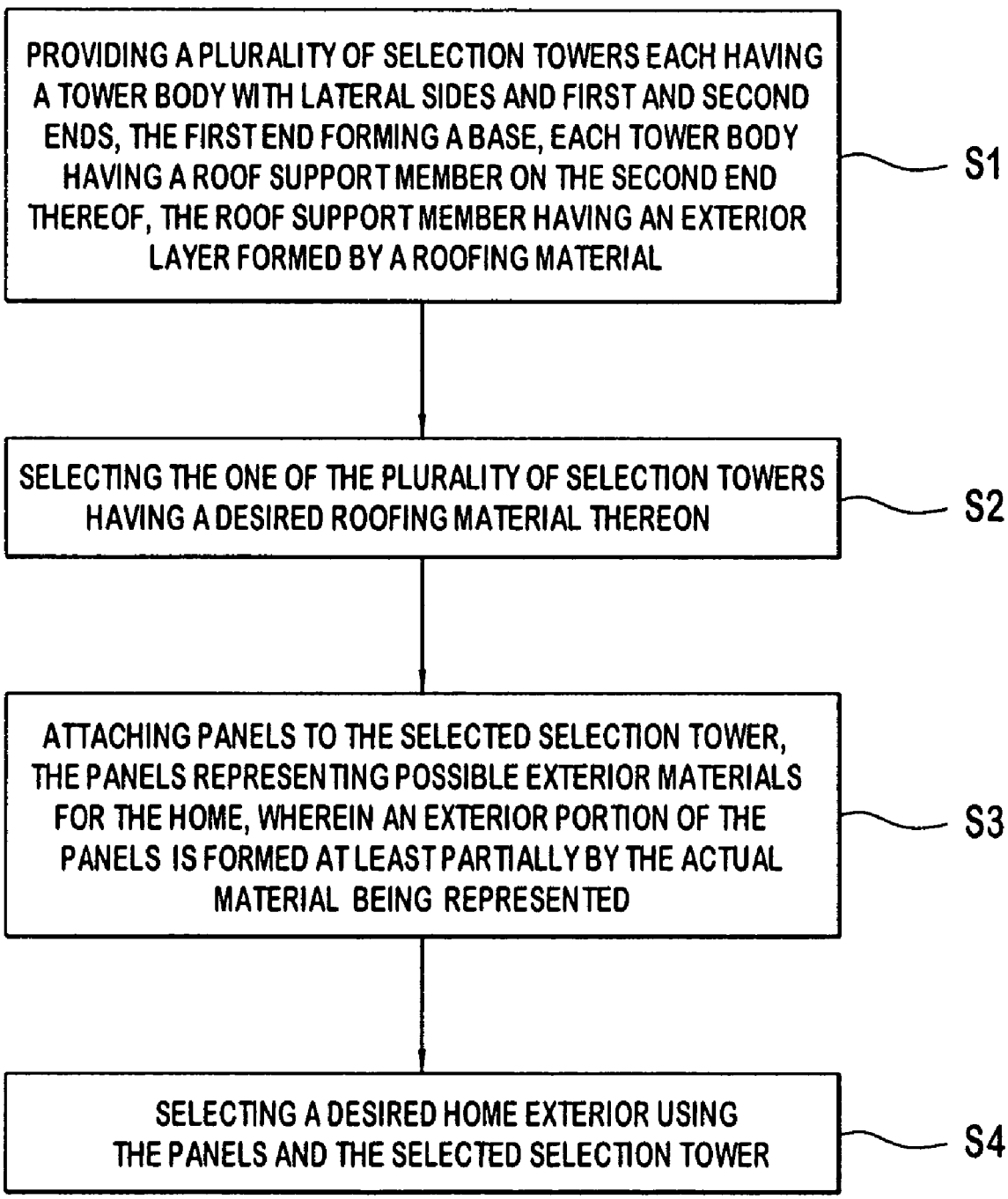
FIG. 10 is a flow chart of a first preferred method for selecting a home exterior according to the present invention.
Figure 11:
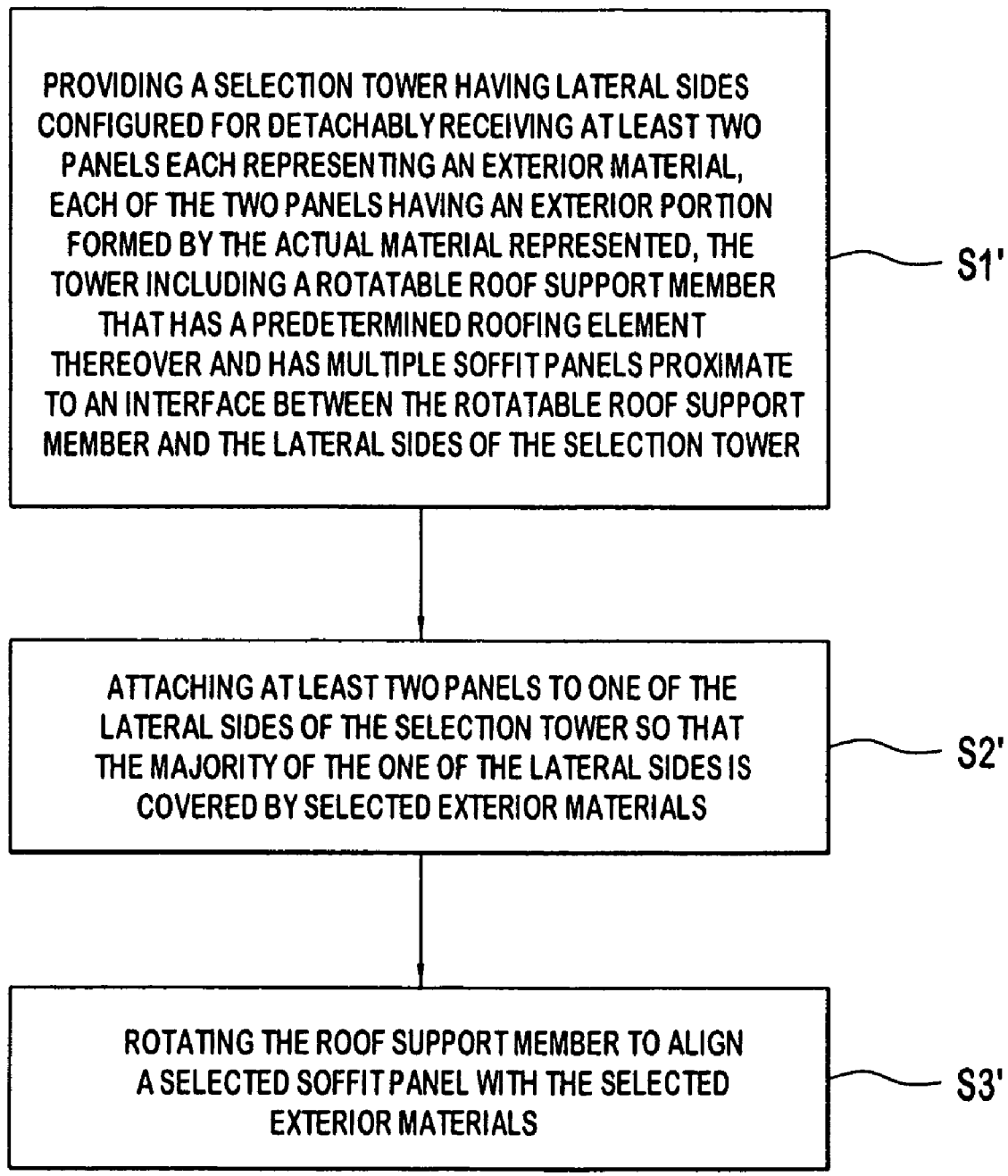
FIG. 11 is a flow chart of a second preferred method of selecting an exterior for a house according to the present invention.

Referring to FIGS. 1–9, wherein like numerals indicate like elements throughout, a preferred embodiment of a home exterior selection kit is shown and designated 20. First and second preferred methods of selecting a home exterior are shown in FIGS. 10 and 11. Briefly stated, the home exterior selection kit 20 can be used to quickly and accurately select the exterior materials for a new home or for renovating an existing home.

Figure 3:
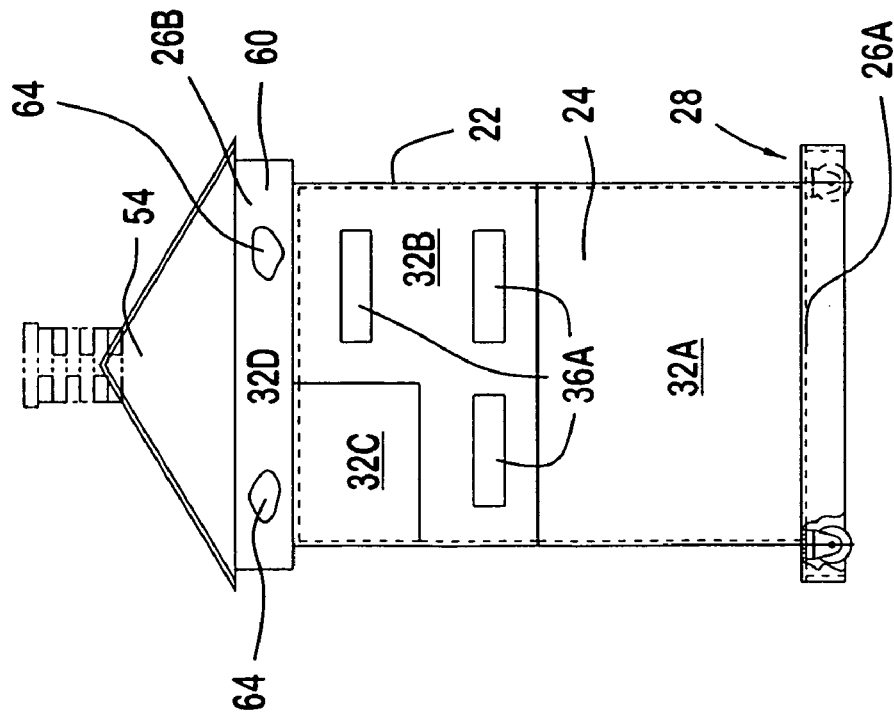
FIG. 3 is an elevational, partially broken away view of a tower body of the selection tower of FIG. 1; first connection plates are preferably located on the lateral side of the tower body; hook and loop material is preferably located on a polygonal portion of the roof support member for securing the soffit panel thereto.
Figure 5:
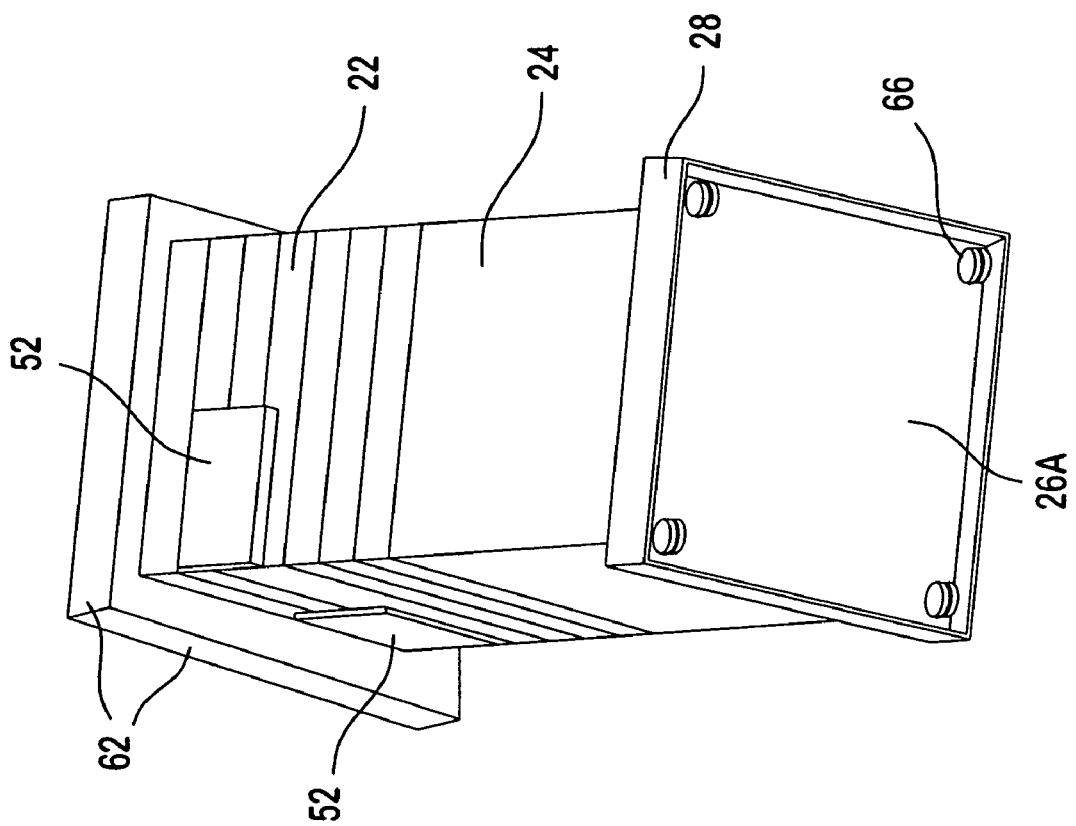
FIG. 5 is an upward perspective view of the selection tower of FIG. 1.
Figure 6:
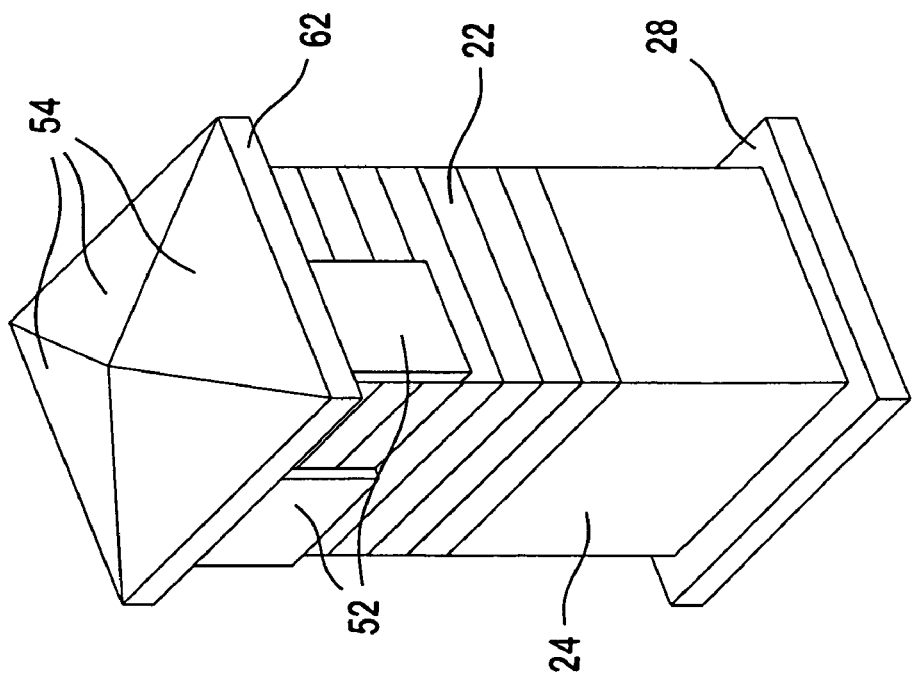
FIG. 6 is a downward perspective view of the selection tower of FIG. 1.

Referring to FIGS. 3 and 4, the home exterior selection kit 20 includes a tower body 22 having lateral sides 24 and first and second ends 26A, 26B, respectively. The first end 26a preferably forms a base 28. The lateral sides 24 of the tower body 22, as viewed in FIGS. 3 and 4, preferably have a generally rectilinear shape and are elongated along a tower body vertical axis 30. Referring to FIGS. 5 and 6, it is preferable that the selection tower 20 has four lateral sides 24.

Referring to FIGS. 1, 3, and 4, each of the lateral sides 24 has at least first and second areas 32A, 32B, respectively. Each lateral side 32A, 32B is configured to detachably engage a panel 34. It is preferred that the tower body is formed of a high strength, sturdy material, such as wood. However, those of ordinary skill in the art will appreciate that any suitable material can be used to form the tower body 22 without departing from the scope of the present invention.

While the first areas 32A are generally shown proximate the bottom of the tower body 22 and the second areas 32B are shown above the first areas 32A, those of ordinary skill in the art will appreciate from this disclosure that the relative location of the first and second areas 32A, 32B can be different or reversed without departing from the scope of the present invention.

Referring to FIGS. 7–9, it is preferable that at least one of the first and second areas 32A, 32B include at least one first connection plate 36A. It is preferred that the first and second plates 36A, 36B are generally identical to each other. Accordingly, the connection plate shown in FIG. 7 has been labeled 36A, 36B. As best shown in FIG. 7, the first connection plate 36A is preferably elongated along connection plate axis 38 which is generally parallel to a supporting surface of the tower body 22 when the first connection plate 36A is installed thereon. As best shown in FIGS. 8 and 9, it is preferable that the first connection plate 36A have a generally Z-shaped cross-section such that, when the first connection plate is secured to a lateral side 24 of the tower body 22, a corresponding slot 40 is formed between an upper portion of the first connection plate 36A and the lateral side 24 of the tower body 22.

Referring specifically to FIG. 9, the home exterior connection kit 20 preferably includes a second connection plate 36B. The second connection plate 36B is preferably configured for attachment to a panel 34, such as a masonry panel 42 or a siding panel 44 (further described below). The second connection plate 36B is partially insertable into the corresponding slot 40 formed by the first connection plate 36A and the lateral side 24 of the tower body 22 of the home exterior selection kit 20.

Referring to FIG. 1, the home exterior selection kit 20 preferably includes a plurality of masonry panels 42. The masonry panels 42 preferably occupy a generally rectilinear, lower portion of a lateral side 24 of the tower body 22. It is preferred that the masonry panels 42 each have an exterior layer formed at least partially of a masonry material. For example, the masonry panel 42 shown in FIG. 1 preferably has an exterior layer formed from rocks 46 with cement 48 or any other suitable grouting material therebetween. Other masonry panels 42 may have an exterior layer formed by stucco, brick, concrete block, or any other suitable masonry material.

The masonry panels 42 are preferably detachably engageable with the first area 32A on each of the lateral sides 24 of the tower body 22. Although one preferable connection method has been described above using first and second connection plates 36A, 36B, those of ordinary skill in the art will appreciate from this disclosure that any suitable connector or connection system can be used without departing from the scope of the present invention.

Referring still to FIG. 1, it is preferred that the home exterior selection kit 20 include a plurality of siding panels 44. The siding panels 44 preferably each have an exterior layer formed at least partially of a siding material. For example, the exterior layer of the siding panels 44 can be formed of wood, aluminum, polymer, vinyl, or any other suitable siding material. It is preferred that the siding panels 44 are detachably engageable with the second area 32B on each of the lateral sides 24 of the tower body 22.

Referring to FIGS. 2 and 3, while it is preferred that the siding panel 44 is attached to the tower body 22 using first and second connection plates 36A, 36B, those of ordinary skill in the art will appreciate from this disclosure that any suitable method of connecting the siding panel 44 to the tower body 22 can be used without departing from the scope of the present invention.

Referring to FIGS. 7–9, the sturdy first and second connection plates 36A, 36B are preferably formed of aluminum and are suitable for supporting heavy panels 34 that may consist of masonry material or the like. It is preferred that the connection plates 36A, 36B are secured to either the lateral sides 24 of the tower body 22 or to the interior surface of the panels 34 via fasteners that extend through bores 50. However, any known suitable connection method can be used to secure the first and second connection plates 36A, 36B to their respective components of the home exterior selection kit 20.

The masonry panels 42 each preferably weigh at least between five and ten pounds and, more preferably, each weigh at least twenty-five to thirty pounds. The masonry panel 42 generally has significant weight due to the large size of the tower body 22 and the corresponding large first area 32A covered by the masonry panel 32 and due to the weight of the actual masonry material located on an outer surface of the masonry panel 42. Similarly, the siding panels 44 preferably weigh at least three to five pounds and, more preferably at least six pounds. The significant weight of the siding panels 44 is also attributable to the large second area 32B covered by the siding panel 44 to accommodate a large tower body 22.

Sturdy first and second connection plates 36A, 36B make it possible to quickly detachably engage the panels 34, 42, 44 from the tower body 22 and make it possible for the panels 34, 42, 44 to have significant weight. This allows the masonry and siding panels 42, 44 to incorporate the actual material represented by the panel on an exterior portion thereof. Having panels 34 formed of the actual material being represented increases the ease with which a homeowner can envision the look that will result from a particular choice of home exterior materials.

Referring to FIGS. 1, 3, and 4, the home exterior selection kit 20 preferably includes each of the lateral sides 24 having a third area 32C configured to detachably engage a panel 34. As best seen in FIG. 1, the home exterior selection kit 20 preferably includes a plurality of shutter panels 52 each having an exterior layer formed of a shutter material. For example, the shutter panels 52 may be formed of wood, steel, or any suitable polymer or material without departing from the scope of the present invention. The shutter panels 52 are preferably detachably engageable with the third area 32C on each of the lateral sides 24 of the tower body 22. It is preferred that the shutter panel 52 be generally rectilinear and occupy an upper left portion of the upper half of the lateral side 24 of the tower body 22. Those of ordinary skill in the art will appreciate from this disclosure that the third area 32C and the associated shutter panel 52 can be of irregular shape, can have various sizes, and can be located anywhere along the lateral sides 24 of the tower body 22 without departing from the scope of the present invention.

While the present invention has been described as incorporating masonry panels 42, siding panels 44, and shutter panels 34, those of ordinary skill in the art will appreciate that other types of panels can be used without departing from the scope of the present invention. For example, a door panel (not shown) and a chimney panel (not shown) can be used without departing from the scope of the present invention. It is preferred the tower body 22 have at least two panels 34 attached thereto to allow a homeowner to judge whether the combination provides an appealing look.

Referring to FIG. 1, the home exterior selection kit 20 preferably includes a roof support member 54. The roof support member 54 is preferably rotatably positioned on the second end 26B of the tower body 22. However, the roof support member 54 can be detachable to allow the roof support member 54 to be changed as desired.

Referring specifically to FIG. 4, it is preferable that the roof support member 54 is attached to the tower body 22 via a turntable bearing 56. Alternatively, the roof support member 54 can be rotatably located on a single post centrally located within the tower body 22 without departing from the scope of the present invention.

A roofing material 58 (also referred to as a roofing panel) is preferably located on at least an upper portion of the roof support member 54. Referring again to FIG. 1, the illustrated roofing material 58 are shingles. However, any known roofing material 58 can be used without departing from the scope of the present invention. A single roofing material 58 can be used on each roof support member 54 or multiple different roofing materials 58 can be used on each roof support member 54 to allow comparison of different roofing materials 58 by simply rotating the roof support member 54.

Referring to FIG. 6, the roof support member 54 preferably has a generally pyramidal shape to present each side of the tower body 22 with a generally triangular looking roof when viewed from the side. However, those of ordinary skill in the art will appreciate that the roof support member 54 can be structured to provide a flat, sloped, rounded, or irregular looking roof without departing from the scope of the present invention.

Referring to FIGS. 3 and 4, it is preferable that the roof support member 54 include a polygonal portion 60 located proximate to the second end 26B of the tower body 22. Each side of the polygonal portion 60 forms an area 32D configured to receive one of the plurality of soffit panels 62. The soffit panels are preferably generally rectilinear and have a longitudinal axis that is generally parallel to the tower base 28. The soffit panels 62 are preferably detachably engageable with the area 32D using hook and loop material 64. However, any known suitable connection mechanism can be used to secure the soffit panels 62 to the area 32D.

As best shown in FIGS. 3 and 4, it is preferred that the tower body 22 is elongated and that the combination of the tower body 22 and the roof support member 54 are over approximately four feet in height. More preferably, the combination of the tower body 22 and the roof support member 54 are over approximately five feet in height.

Referring to FIG. 5, it is preferable that the home exterior selection kit 20 include wheels 66 (preferably caster wheels) on the first end 26A of the tower body 22. It is preferred that four wheels are positioned proximate the tower's base corners.

The home exterior selection kit 20 may include a second tower body 22 or a second, third, and a fourth tower body 22 for side-by-side comparison of different home exteriors. In some cases, each of the tower bodies 22 will have a particular roofing material 58 thereon to allow a homeowner to first select the appropriate roof for their home.

Referring to FIG. 10, a first preferred method of selecting a home exterior includes, in step S1, providing a plurality of selection towers each having a tower body 22 with lateral sides 24 and first and second ends 26A, 26B. The first end 26A forms a base. Each tower body 22 has a roof support member 54 on the second end 26B thereof. The roof support member has an exterior layer formed by a roofing material 58. It is preferred that the step of providing a plurality of selection towers include providing a selection tower that is at least four feet in height to simplify selection of a desired home exterior.

During step S2, one of the plurality of selection towers that has a desired roofing material thereon is selected. Then, in step S3, panels 34 are attached to the selected selection tower 23. Alternatively, a single selection tower can be used that has an interchangeable roof or a single selection tower can be used that has different roofing material on each side to allow roof selection by rotating the roof support member.

The panels 34 represent possible exterior materials for the home. It is preferred that an exterior portion of the panels 34 is formed at least partially by the actual material being represented. The panels 34 may correspond to any type of exterior section of a home. For example, the panels 34 may correspond to a masonry section, a siding section, a soffit section, a roofing material section, a chimney section, a door section, a window section, or the like without departing from the scope of the present invention. It is preferred that when attaching panels to the selected selection tower 23, that panels 34 are attached to multiple lateral sides 24 of the selected selection tower 23 to compare multiple possible home exteriors each having a common roofing material 58.

It is preferred that the step of attaching panels 34 further include engaging the first connection plate 36A, located on the selected selection tower 23, with a second connection plate 36B, located on a panel 34. The first connection plate 36A is secured to the lateral side 24 of the selected selection tower 23 to form a corresponding slot 40 between the first connection plate 36A and the selected selection tower 23. The second connection plate 36B is configured for attachment to the panel 34. The second connection plate is partially insertable into the corresponding slot 40 formed by the first connection plate 36A to secure the panel 34 to the selected selection tower 23. The first and second connection plates 36A, 36B are preferably suitable for supporting panels 34 weighing up to at least ten to thirty pounds on the selected tower body 22. It is preferred that the panels 34 include at least one masonry panel 42, siding panel 44, shutter panel 52, and soffit panel 62.

In step S4, a desired home exterior is selected using the panels 34 and the selected selection tower 23. The method preferably includes moving the selected selection tower 23 to various locations to view a possible home exterior in different lighting conditions. The selected selection tower 23 is preferably moved using wheels 66 attached to the first end 26a of the selection tower 23.

Referring to FIG. 11, a second method of selecting an exterior for a house includes, in step S1', providing a selection tower 23 having lateral sides 24 configured for detachably receiving at least two panels 34 each representing an exterior material. Each of the two panels 34 represents an exterior material. Each of the two panels has an exterior portion formed by the actual material represented. The tower includes a rotatable roof support member 54 that has a predetermined roofing element 58 thereover and has multiple soffit panels 62 proximate to an interface between the rotatable roof support member 54 and the lateral sides 24 of the selection tower 23.

During step S2', at least two panels are attached to one of the lateral sides 24 of the selection tower 23 so that the majority of one of the lateral sides 24 is covered by selected exterior materials. During step S3', the roof support member 54 is rotated to align a selected soffit panel 62 with the selected exterior materials.

Referring to FIGS. 1–9, one embodiment of the present invention 20, preferably operates as follows. A new home purchaser or a homeowner wishing to renovate the exterior of an existing home chooses from multiple selection towers 23 based on a preferred roofing material 58. Then, the four sides of the selection tower 23 are viewed to determine which combination of masonry panels 42, siding panels 44, and shutter panels 62 are preferred. If desired, any of the panels 34 can be detached from the tower body 22 and replaced with an alternate panel 34. Once one or more preferred combinations have been arranged on the selection tower 23, the selection tower 23 can be moved to various locations to view the possible home exteriors in different lighting.

It is recognized by those skilled in the art that changes may be made to the above described embodiment of the invention without departing from the broad inventive concept thereof. It is understood, therefore, that this invention is not limited to the particular embodiment disclosed, but is intended to cover all modifications which are within the spirit and scope of the invention as defined by the appended claims and/or shown in the attached drawings.

What is claimed is:

1. A home exterior selection kit, comprising:
   a tower body having lateral sides and first and second ends, the first end forming a base;
   each of the lateral sides has at least first and second areas each configured to detachably engage a panel;
   a plurality of masonry panels each having an exterior layer formed at least partially of a masonry material, the masonry panels being detachably engageable with the first area on each of the lateral sides;
   a plurality of siding panels each having an exterior layer formed at least partially of a siding material, the siding panels being detachably engageable with the second area on each of the lateral sides; and
   a roof support member rotatably located on the second end of the tower body, at least one roofing material being located on at least an upper portion of the roof support member.

2. The home exterior selection kit of claim 1, wherein at least one of the first and second areas further comprises at least one first connection plate, the first connection plate being elongated with a generally Z-shaped cross-section such that, when each first connection plate is secured to a lateral side of the tower body, a corresponding slot is formed between a portion of the first connection plate and the lateral side of the tower body.

3. The home exterior connection kit of claim 2, further comprising a second connection plate, the second connection plate being configured for attachment to any one of the masonry panels and the siding panels, the second connection plate being partially insertable into the corresponding slot formed by the first connection plate.

4. The home exterior selection kit of claim 3, wherein each of the masonry panels each weigh at least ten pounds.

5. The home exterior selection kit of claim 4, wherein each of the masonry panels each weigh at least twenty-five pounds.

6. The home exterior selection kit of claim 4, wherein each of the siding panels weighs at least three pounds.

7. The home exterior selection kit of claim 5, wherein each of the siding panels weighs at least six pounds.

8. The home exterior selection kit of claim 1, wherein each of the lateral sides includes a third area configured to detachably engage a panel.

9. The home exterior selection kit of claim 8, further comprising a plurality of shutter panels each having an exterior layer formed of a shutter material, the shutter panels being detachably engageable with the third area on each of the lateral sides of the tower body.

10. The home exterior selection kit of claim 1, further comprising a plurality of caster wheels on the first end of the tower body.

11. The home exterior selection kit of claim 1, wherein the roof support member is attached to the tower body via a turntable bearing.

12. The home exterior selection kit of claim 1, wherein the tower body has four lateral sides.

13. The home exterior selection kit of claim 1, wherein the roof support member includes a polygonal portion located proximate to the second end of the tower body, each side of the polygonal portion forming an area configured to receive one of a plurality of soffit panels.

14. The home exterior selection kit of claim 13, wherein any one of the soffit panels is detachably engaged with the area using hook and loop material.

15. The home exterior selection kit of claim 1, further comprising a second tower body for side-by-side comparison of different home exteriors.

16. The home exterior selection kit of claim 1, wherein the tower body is elongated and the combination of the tower body and the roof support member are over four feet in height.

17. The home exterior selection kit of claim 1, wherein the tower body is elongated and the combination of the tower body and the roof support member are over five feet in height.

18. The home exterior selection kit of claim 1, further comprising a second tower body, a third tower body, and a fourth tower body for side-by-side comparison of different home exteriors.

19. A home exterior selection kit, comprising:
- a tower body having lateral sides and first and second ends, the first end forming a base;
- each of the lateral sides has at least first and second areas each configured to detachably engage a panel;
- a plurality of masonry panels each being detachably engageable with the first area on each of the lateral sides;
- a plurality of siding panels each being detachably engageable with the second area on each of the lateral sides; and
- a roof support member located on the second end of the tower body, a roofing panel being located on the roof support member.

20. The home exterior selection kit of claim 19, further comprising a plurality of roof support members, wherein the roof support member located on the second end of the tower body is detachable to allow the interchanging of the roof support member.

* * * * *